UNITED STATES PATENT OFFICE.

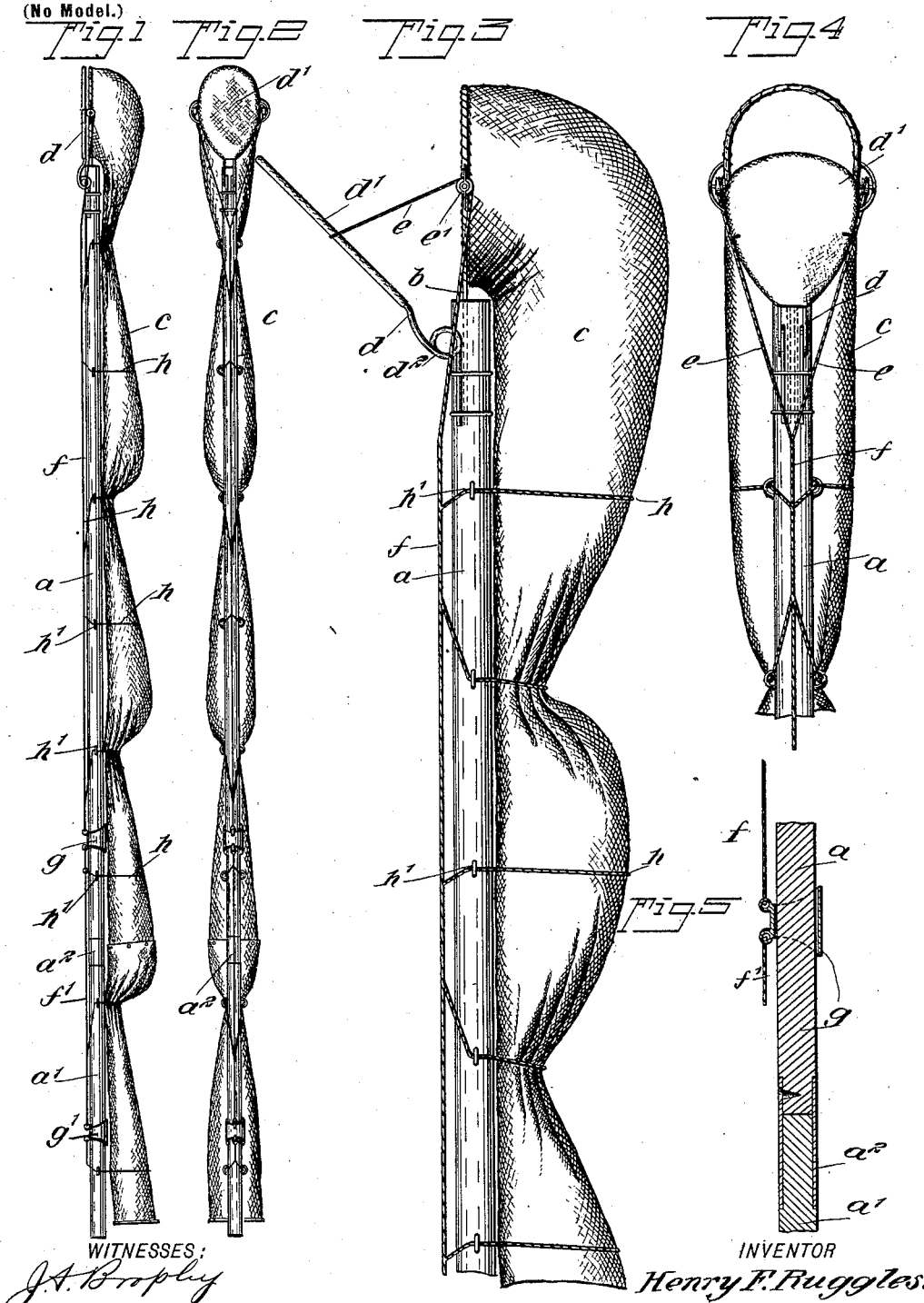

HENRY F. RUGGLES, OF VANCEBURG, KENTUCKY.

FRUIT-PICKER.

SPECIFICATION forming part of Letters Patent No. 673,225, dated April 30, 1901.

Application filed August 30, 1900. Serial No. 28,594. (No model.)

*To all whom it may concern:*

Be it known that I, HENRY F. RUGGLES, a citizen of the United States, and a resident of Vanceburg, in the county of Lewis and State of Kentucky, have invented a new and Improved Fruit-Picker, of which the following is a full, clear, and exact description.

This invention relates to a fruit-picker of that class in which a tube of flexible material is provided to form a passage through which the fruit may pass from the tree to the ground, thus avoiding the bruising of the fruit; and the invention consists in certain devices for causing the fruit to move slowly downward to prevent its rapid and violent descent and its consequent bruising.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a front elevation thereof. Fig. 3 is an enlarged side elevation showing the jaw open. Fig. 4 is an enlarged front elevation of the same, and Fig. 5 is a detail section showing the joint in the staff.

The staff is preferably constructed in two sections $a$ and $a'$, so that should it be desired to shorten the staff one of the sections may be dispensed with. These sections are removably connected by a ferrule $a^2$ in the manner which will be well understood by a reference to the drawings. The upper end of the staff carries an oval wire frame $b$, to which is fastened one end of the canvas or other flexible fabric tube $c$. The mouth of the tube is commanded by a jaw comprising a wire frame $d$ and a canvas covering $d'$. The shank of the wire frame $d$ is formed with a spring $d^2$, which is fastened to the end of the staff and which tends to hold the jaw open. Bridle-cords $e$ are connected with the sides of the jaw $d$ and are rove over small sheaves $e'$, attached to the frame $b$, so that by pulling downward on the cords $e$ the jaw may be closed. The bridle-cords $e$ are connected with a main cord $f$, which passes down alongside of the staff. This cord $f$ is connected at the lower end of the section $a$ of the staff with a collar $g$, which slides thereon, and a continuation $f'$ of this cord passes from the collar $g$ downward to a similar collar $g'$ on the lower section $a'$ of the staff. By operating the collars $g$ or $g'$ the jaw $d$ may be operated. When the section $a'$ of the staff is disconnected from the device, the auxiliary cord $f'$ is disconnected from the collar $g$, and when the section $a'$ is in place the cord $f'$ is connected with the collar $g$, as indicated in Figs. 1 and 2.

For causing the fruit to travel slowly down the tube $c$ I provide a number of looped cords $h$, forming brails, which pass around the tube and which when drawn taut against the staff cause the tube to be brailed up or contracted, as shown in the drawings. These cords $h$ pass through leaders or eyes $h'$, fastened to the staff, and are connected with the cords $f$ and $f'$. These cords $h$ are so arranged that when the main cord is moved in one direction alternate of the cords $h$ contract the tube, and when the main cord is moved in the other direction the other set of the cords $h$ contract the tube, while the set first mentioned release the tube. Therefore there are two sets of brail-cords, the members of which are placed alternately with respect to all of the cords $f f'$, and by the movement of the main cord back and forth along the staff the tube $c$ is alternately drawn together and released at various points along its length. The result of this is that the tube is formed into short lengths, through each of which the fruit drops and in each of which the movement of the fruit is arrested temporarily and then permitted to continue on its downward passage. This prevents the fruit from accumulating sufficient momentum to bruise it in its fall. The main cord $f$ and its branch $f'$ are adapted to be moved downward by the manual operation of the collars $g$ or $g'$, and the main cord is moved automatically back by the action of the spring $d^2$. The operator therefore holds the staff in one hand and slides the lowermost of the collars $g$ or $g'$ with the other hand, this operation having two results—first, the operation of the jaw $d$, causing it to open and close on the fruit and work the same off of the tree, and, second, the closing and opening of the tube $c$, causing the fruit to fall gradually.

Having thus described my invention, I claim as new and desire to secure by Letters Patent—

1. A fruit-picker, having a staff, a collapsible tube extending along the same, two brail-cords passing around the tube and having guided movement on the staff, a connection between the brail-cords, and means at each end of such connection for moving the same back and forth, the brail-cords being arranged to work alternately to open and close the tube, in the manner specified.

2. A fruit-picker, having a staff, a flexible tube extending along the same, a jaw working with one end of the tube, a spring serving to throw the jaw open, means working with the tube to contract and release the same, and a connection between said means and the jaw whereby the spring of the jaw works, in one direction, the said means for contracting and releasing the tube, which means are manually operative in the other direction.

3. A fruit-picker, comprising a collapsible tube adapted to have the fruit passed therethrough, two separate means for contracting and releasing the tube, and a connection between said means, whereby alternately to operate the same, for the purpose specified.

In testimony whereof I have signed my name to this specification in the presence of two subscribing witnesses.

HENRY F. RUGGLES.

Witnesses:
W. E. DARRAGH,
S. G. HILLIT.